United States Patent
Goenka et al.

(10) Patent No.: US 12,466,787 B2
(45) Date of Patent: Nov. 11, 2025

(54) PROCESS FOR SYNTHESIS OF HIGH PURITY 1-[3-(TRIFLUOROMETHYL)PHENYL] ETHANONE OXIME

(71) Applicant: LAXMI ORGANIC INDUSTRIES LTD, Mumbai (IN)

(72) Inventors: Ravi Goenka, Mumbai (IN); Ajay A Audi, Mumbai (IN)

(73) Assignee: LAXMI ORGANIC INDUSTRIES LTD, Mumbai (IN)

( * ) Notice: Subject to any disclaimer, the term of this patent is extended or adjusted under 35 U.S.C. 154(b) by 621 days.

(21) Appl. No.: 17/904,964

(22) PCT Filed: Apr. 23, 2020

(86) PCT No.: PCT/IN2020/050378
§ 371 (c)(1),
(2) Date: Aug. 25, 2022

(87) PCT Pub. No.: WO2021/171301
PCT Pub. Date: Sep. 2, 2021

(65) Prior Publication Data
US 2023/0167051 A1    Jun. 1, 2023

(30) Foreign Application Priority Data
Feb. 25, 2020    (IN) .............. 202021007935

(51) Int. Cl.
*C07C 249/08* (2006.01)
*C07C 17/35* (2006.01)
*C07C 45/68* (2006.01)

(52) U.S. Cl.
CPC ............ *C07C 249/08* (2013.01); *C07C 17/35* (2013.01); *C07C 45/68* (2013.01)

(58) Field of Classification Search
None
See application file for complete search history.

(56) References Cited

U.S. PATENT DOCUMENTS

2016/0107986 A1    4/2016   Schnatterer et al.

FOREIGN PATENT DOCUMENTS

| CN | 105294490 A | 2/2016 |
|---|---|---|
| EP | 0182407 B1 | 5/1990 |

OTHER PUBLICATIONS

International Search Report from PCT/IN2020/050378 Aug. 27, 2020, 1 pg.
Nakatani et al., "Preparation of Trifluoromethylphenyl Magnesium Halides in the Presence of 1-9 LiCl and Synthesis of 2'-Trifluoromethyl-Aromatic Ketones", Organic Process Research & Development, 2016, vol. 20 (9), p. 1633.1636˙; retrieved from internet URL: https://pubs.acs .org/doi/abs/10.1021/acs.oprd.6b00200, p. 1634, left col. para 2-3; p. 1634, right col. para 3: p. 1635. left col. para 1; p. 1635, right col. para 2; Table 2-3.
Saikia et al., "A rapid, convenient, solventless green approach for the synthesis of oximes using 1-9 grindstone chemistry", Organic and Medicinal Chemistry Letters, 2011, vol. 1 :12, p. 1-6. retrieved from internet URL: https://www.ncbi.nlm.nih .gov/pmc/articles/PMC3339398/pdf, p. 2, left col. para 3 to right col. para 1; p. 3, right col. para 3 to p. 5, left col. para 1; Scheme 1.

*Primary Examiner* — Renee Claytor
*Assistant Examiner* — Jennifer C Sawyer
(74) *Attorney, Agent, or Firm* — Troutman Pepper Locke LLP; Tim Tingkang Xia, Esq.

(57) ABSTRACT

A process for preparation of 3-Trifluoromethyl acetophenone oxime of formula I includes reacting an isomeric mixture of halo benzotrifluoride with Mg metal in an organic solvent in presence of a catalyst to obtain a Grignard complex. The Grignard complex is reacted with a ketene in hydrocarbon solvent in presence of transition metal ligand-acid complex to obtain an isomeric mixture of trifluoromethyl acetophenone. Finally, the isomeric mixture of trifluoromethyl acetophenone is reacted with hydroxylamine salt to obtain compound of formula I.

9 Claims, No Drawings

PROCESS FOR SYNTHESIS OF HIGH PURITY 1-[3-(TRIFLUOROMETHYL)PHENYL] ETHANONE OXIME

FIELD OF THE INVENTION

The present invention relates to a process for preparing 3-Trifluoromethyl acetophenone (TFMAP) oxime. More particularly, it relates to a process for preparing 3-Trifluoromethyl acetophenone oxime with high purity and high yield.

BACKGROUND OF THE INVENTION

The compound of formula I is an important intermediate for the preparation of pharmaceuticals, dyestuffs, perfumes, pesticides and other products. In particular, this compound is an important intermediate in the preparation of agrochemical, trifluoxystrobin.

The existing commercial route of synthesizing the title molecule starting from benzotrifluoride comprises of 6-7 chemical reaction steps along with separation of unwanted isomers formed therein. An overall route of synthesis involves steps of nitration, hydrogenation, diazotization, oximation using acetaldoxime, followed by deoximation to get 3 trifluoromethyl acetophenone.

WO1988010247A1 and U.S. Pat. No. 6,184,417 disclose methods for the preparation of TFMAP oxime involving nitration of benzotrifluoride, reduction, diazotisation and condensation with acetaldehyde oxime using Copper sulphate to give TFMAP oxime which needs to be converted back to ketone (TFMAP) and purified by distillation to attain required purity. However, the process provides TFMAP in comparatively lower yield. Moreover, unwanted isomers are produced during the nitration step (~25% para and ~3-5% ortho isomer) which have very limited applications in the field of agrochemical active ingredient which is about to get banned due to some regulatory issues. Furthermore, large amounts of effluent are generated in this process leading to the process not being environment friendly.

In yet another commercial process, Organic Process Research & Development-20(9),1633-1636; 2016 discloses that pure 3-Bromobenzotrifluoride is converted to its Grignard with magnesium metal in ethereal solvent to corresponding Grignard complex, this Grignard complex on acylation with acetic anhydride results in trifluoromethyl acetopheneone. This on oximation using Hydroxyl amine sulphate or hydrochloride gives TFMAP oxime.

Though acetic anhydride or acetyl chloride are the traditional reagents commercially used for typical acylation reactions, acetic anhydride falls under narcotics applications and hence needs very tight regulatory control. Also, it generates equimolar quantity of acetic acid as by-product along with some process related impurities. Huge quantity of such waste acetic acid is a global challenge for destruction as well as recovery due to its own limitations of contaminations, smell and colour. Acetyl chloride as acylation reagent generates equimolar quantity of HCl as by-product along with some process related impurities. This HCl stream is corrosive and ultimately ends up into huge quantities of salt formation. The aqueous streams containing these salts impart high load on effluent treatment plants. Secondly the process of producing acetyl chloride itself generates huge salts prominent effluents. Destruction of these salts is laborious, economic and environmental challenge. In some cases, where acetic acid is used as acylation reagent for C-acylation, it has its own limitations due to drastic reaction conditions, lower conversions and higher process related by-products. Hence Acetic acid is prominently used in O- or N-acylation reactions.

CN 102690180 discloses yet another process for TFMAP preparation involving using n Butyl lithium and acetyl chloride. The trifluoromethylbenzene is reacted with n-butyl lithium an d the acetylating agent acetyl chloride/acetic anhydride in presence of inorganic salt such as a catalyst cuprous chloride in THF solvent at −40 to −70° C. for 5 to 10 hours to synthesize m-trifluoromethylacetophenone. However, this process is not cost effective and reactants used for this synthesis are expensive and hazardous. Cryogenic set up requirement to conduct the reaction makes the process economically non-viable.

Accordingly, there is a substantial need to overcome the disadvantages associated with the known processes for preparation of 3-Trifluoromethyl acetophenone (TFMAP) oxime.

SUMMARY OF THE INVENTION

In one aspect, the present invention provides a process for preparation of 3-Trifluoromethyl acetophenone oxime of formula I comprising the steps of:
a) Reacting an isomeric mixture of halo benzotrifluoride with Mg metal in an organic solvent in presence of a catalyst to obtain a Grignard reagent;
b) Reacting the Grignard reagent with a ketene in hydrocarbon solvent in presence of transition metal ligand-acid complex to obtain an isomeric mixture of trifluoromethyl acetophenone; and
c) Reacting the isomeric mixture of trifluoromethyl acetophenone with hydroxylamine salt to obtain compound of formula I.

DESCRIPTION OF THE INVENTION

The present invention provides a process for preparation of 3-Trifluoromethyl acetophenone oxime. The process provides highly pure 1-[3-(trifluoromethyl) phenyl]ethanone Oxime in lesser numbers of reaction steps as compared to existing processes and with less than 0.1% unknown impurity.

The present invention relates to a process for preparation of 3-Trifluoromethyl acetophenone oxime of formula I comprising the steps of:
a) Reacting an isomeric mixture of halo benzotrifluoride (Ia) with Mg metal in an organic solvent in presence of a catalyst to obtain a Grignard reagent (Ib);
b) Reacting the Grignard reagent (Ib) with a ketene (Ic) in hydrocarbon solvent in presence of transition metal ligand-acid complex to obtain an isomeric mixture of trifluoromethyl acetophenone (Id); and
c) Reacting the isomeric mixture of trifluoromethyl acetophenone (Id) with hydroxylamine salt to obtain compound of formula I as defined by the reaction scheme 1.

Reaction Scheme 1.

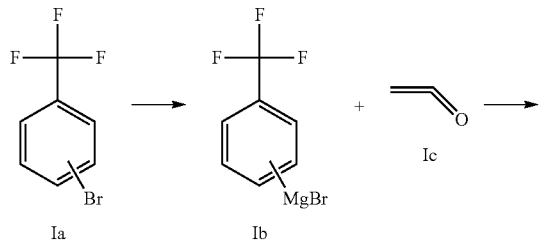

-continued

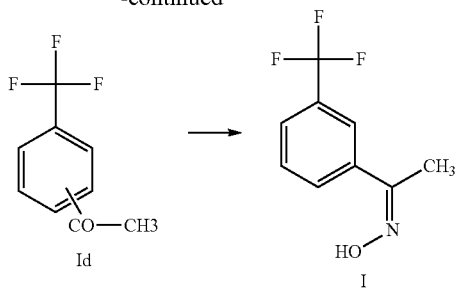

As shown in the reaction scheme 1, the process of halogenation of benzotrifluoride is carried out using any of the known methods resulting in a mixture of meta, para and ortho halo isomers in the ratio of ~96: 3:1. In this regard, the orientation of CF3 group results in meta rich product in halogenation reaction of benzotrifluoride. Furthermore this percentage of meta isomer is improved by optimisation of halogenation reactions. The Grignard reaction of this isomeric mixture of halo benzotrifluoride with magnesium metal in an organic solvent gives the corresponding mixed Grignard complex. This reaction is preferably carried out in presence of catalytic iodine or ethylene dibromide or catalytic amount of any other alkyl magnesium bromide can be used as catalyst.

The organic solvent is selected from, but not limited to, THF, Diethyl ether, diisopropyl ether, methyl isobutyl ether, methyl THF.

In the next step, this Grignard complex on acylation with ketene solution in hydrocarbon solvent in presence of selected acid and metal ligand catalyst results in isomeric mixture of trifluoromethyl acetopheneone The transition metal ligand is selected from, not limited to, Fe(AcAc)3, Ir(AcAc)3, Ru(AcAc)3 or Cr(AcAc)3 and the acid complex is organic aliphatic acid selected from, but not limited to acetic acid, propionic acid, butanoic acid or isobutanoic acid. The hydrocarbon solvent is selected from toluene, xylene or mesitylene. The ratio of Grignard complex to ketene is in the range of 1: 0.95-1.25 molar equivalents.

The isomeric mixture of trifluoromethyl acetophenone is reacted with hydroxyl amine salt to obtain the TFMAP Oxime. The hydroxyl amine salt is preferably the sulphate or chloride salt. Separation of these isomers is difficult by traditional methods of fractional distillation or crystallization due to their very close physical properties and solubility. The high purity meta isomer of TFMAP oxime is thus obtained by separation of other isomeric impurities by simple solvent purification method.

Advantageously, the process of the present invention is clean and environmentally friendly resulting in meta-TFMAP oxime with purity higher than 99.5%, containing para isomer less than 0.2% and any other impurity less than 0.1%. The effluents generated in this process are quite on much lower as compared to other commercial processes. Ketene is an environmentally friendly reagent which imparts insertion of —COCH3 group (acyl group) without formation of any by-products as generated with acetic anhydride or acetyl chloride.

Moreover, since the reactivity of ketene is quite high the reaction proceeds at faster rate and results in almost quantitative conversions with well optimized parameters.

EXAMPLES

The following experimental examples are illustrative of the invention but not limitative of the scope thereof:

Preparation of Isomeric Mixture Trifluoromethyl Acetopheneone

To a mixture of Mg turnings (5.8 g), and dry THF (150 ml) under nitrogen atmosphere at room temperature in a 500 mL flask, catalytic iodine was added. Mixture of 2, 3 and 4 bromo (trifluoromethyl) benzene (50 g) was added gradually to it using a dropping funnel at ~40-50° C. The reaction mixture was further stirred at 40-5° C. for 2-4 h to obtain the Grignard reagent. Completion of the Grignard formation was confirmed with the help of Gas liquid chromatography (GLC).

The Grignard reagent was gradually added into a solution of ketene (28.3 g,) in aromatic hydrocarbon (75 ml) in presence of complex prepared from catalytic amount of transition metal ligands preferably Fe ligands and organic aliphatic acid at 0 to −10° C. in a 500 mL flask under N2 atmosphere. The reaction mixture was further stirred at 0 to −10° C. for 2-3 h. A sample of the solution was analyzed by GLC. The overall process yield is 78 to 85%.

A second alternative of preparing the trifluoromethyl acetophenone was carried out as follows: The Grignard reagent was gradually added simultaneously along with solution of ketene (28.3 g) in a 500 mL flask under N2 atmosphere into a solution of complex prepared from catalytic amount of transition metal ligands preferably Fe ligands and aliphatic acid in aromatic hydrocarbon (75 ml) at 0 to −10° C. in such a way that reaction mass always has slight excess of ketene solution. The reaction mixture was further stirred at 0 to −10° C. for 2 -3 h. A sample of the solution was analyzed by GLC for completion of the reaction. The overall process yield is 75 to 81%.

Preparation of 3 Trifluoromethyl Acetopheneone Oxime

The isomeric mixture of trifluoromethyl acetophenone (30 gm) was dissolved in aliphatic alcohol (30 ml).To this solution, was added equivalent amount of hydroxylamine hydrochloride or hydroxyl amine sulphate under stirring. 30% NaOH solution (1-1.3 eq) was added gradually to this solution at ambient temperature. The reaction mixture was warmed and stirred at 40 to 45° C. for 5-7 h. The reaction progress was monitored on GLC. After reaction completion, product is extracted in dichloromethane solvent and isolated by solvent removal. The product thus obtained was purified using cyclic saturated hydrocarbons such as cyclopentane, cyclohaxane etc., by crystalizing out the required 3-trifluoromethyl acetopheneone oxime (3-TFMAP-oxime). The isolated yield of pure 3-TFMAP oxime after purification was ~80-85%.

The foregoing description of the invention has been set merely to illustrate the invention and is not intended to be limiting. Since the modifications of the disclosed embodiments incorporating the spirit and substance of the invention may occur to the person skilled in the art, the invention should be construed to include everything within the scope of the disclosure.

The invention claimed is:

1. A process for preparation of 3-Trifluoromethyl acetophenone oxime of formula I, comprising:
 a) reacting an isomeric mixture of a halo benzotrifluoride of formula Ia with Mg metal in an organic solvent in presence of a catalyst to obtain a Grignard complex of formula Ib, wherein said formulae Ia and Ib are respectively as follows, in which X is halogen:

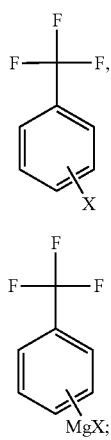

Ia

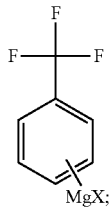

Ib b) reacting the Grignard complex of said formula Ib with a ketene of formula Ic in a hydrocarbon solvent in the presence of a transition metal ligand-acid complex to obtain an isomeric mixture of trifluoromethyl acetophenone of formula Id, wherein said formulae Ic and Id are respectively as follows:

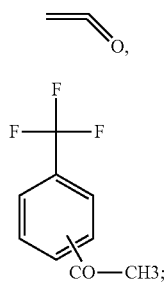

Ic

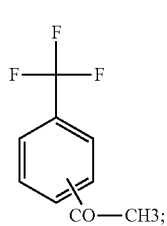

Id and c) reacting the isomeric mixture of trifluoromethyl acetophenone of said formula Id with a hydroxylamine salt to obtain the 3-Trifluoromethyl acetophenone oxime of formula I, wherein said formula I is as follows:

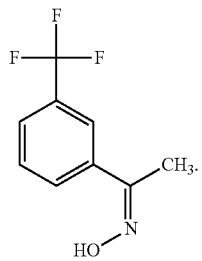

I

2. The process as claimed in claim 1, wherein the isomeric mixture in a) is a mixture of meta: para: ortho halo benzotrifluoride in the ratio of 96:3:1.

3. The process as claimed in claim 1, wherein the catalyst is one selected from the group consisting of iodine, ethylene dibromide and other alkyl magnesium bromide.

4. The process as claimed in claim 1, wherein the transition metal ligand is one selected from the group consisting of Fe(AcAc)3, Ir(AcAc)3, Ru(AcAc')3 and Cr(AcAc)3.

5. The process as claimed in claim 1, wherein the acid complex is an organic aliphatic acid selected from the group consisting of acetic acid, propionic acid, butanoic acid and isobutanoic acid.

6. The process as claimed in claim 1, wherein a ratio of Grignard complex to ketene is in the range of 1:0.95-1.25 molar equivalents.

7. The process as claimed in claim 1, wherein the hydrocarbon solvent in b) is one selected from the group consisting of toluene, xylene and mesitylene.

8. The process as claimed in claim 1, wherein the hydroxylamine salt in c) is one selected from the group consisting of a sulphate salt and a chloride salt.

9. The process as claimed in claim 1 further comprising solvent purification to obtain the compound of the formula I with a purity higher than 99%.

* * * * *